(12) United States Patent
Zlotnick

(10) Patent No.: US 8,095,510 B2
(45) Date of Patent: Jan. 10, 2012

(54) DATA RESTORATION IN A STORAGE SYSTEM USING MULTIPLE RESTORE POINTS

(75) Inventor: Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 12/177,787

(22) Filed: Jul. 22, 2008

(65) Prior Publication Data
US 2010/0023561 A1  Jan. 28, 2010

(51) Int. Cl.
*G06F 17/30* (2006.01)
(52) U.S. Cl. .................................. 707/639; 707/649
(58) Field of Classification Search .................. 707/639, 707/649
See application file for complete search history.

(56) References Cited

U.S. PATENT DOCUMENTS

| | | | |
|---|---|---|---|
| 6,715,048 B1 * | 3/2004 | Kamvysselis | 711/162 |
| 7,010,553 B2 | 3/2006 | Chen et al. | |
| 7,284,019 B2 | 10/2007 | Adkins et al. | |
| 7,293,134 B1 | 11/2007 | Noland et al. | |
| 2007/0174569 A1 * | 7/2007 | Schnapp et al. | 711/162 |

* cited by examiner

*Primary Examiner* — John E Breene
*Assistant Examiner* — Dennis Myint
(74) *Attorney, Agent, or Firm* — Zilka-Kotab, PC

(57) ABSTRACT

A data restoration method comprising determining whether a restoration process is in progress, in response to receiving a read request to read contents from a track on a source volume (ST[i]); reading data from ST[i], in response to determining that the restoration process is not in progress; determining whether the read request was originated from a host, in response to determining the restoration process is in progress; reading the data directly from ST[i], in response to determining the read request was not originated from a host; determining whether ST[i] is designated as remote with respect to the restore operation, in response to determining the read request was originated from a host; reading the data directly from ST[i], in response to determining ST[i] is designated as local; and reading the data from a track on a target volume (TT[i]), in response to determining ST[i] is designated as remote.

20 Claims, 5 Drawing Sheets

DATA RESTORATION IN A STORAGE SYSTEM USING MULTIPLE RESTORE POINTS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to data restoration in computing systems and, more particularly, to a system and method for restoring data to a data storage volume from snapshot backups of the data.

BACKGROUND

Taking a snapshot or a flashcopy of a data collection refers to the process of copying data stored on a first volume (i.e., a source) at a certain point in time (e.g., T1) and storing the copied data on a second volume (i.e., a target). When several snapshots of the same data at different times (e.g., T1, T2, T3, etc.) are taken, the data can be restored to any of the previous snapshot states, should any corruptions or other problems with the data are detected.

Current restoration schemes typically require reads or writes to and from the source volume to be suspended during the restoration process. Therefore, the restoration process results in system downtime which is highly undesirable and costly, particularly where large volumes of data are to be restored. Methods and systems are needed that can overcome the aforementioned shortcomings.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for restoring data to a volume comprises restoring first data on a source volume from second data on a target volume, wherein the second data is a snapshot of the first data taken at time T1, such that each track on the target volume corresponds to a track on the source volume. A track on the target volume refers to a corresponding track on the source volume, if data stored on the corresponding track has not been modified since T1. A track on the target volume includes a local copy of data that existed on a corresponding track on the source volume prior to T1, if data stored on the corresponding track was modified since T1. During restoration, a track on the source volume refers to a corresponding track on the target volume, if data stored on the track on the source volume has been modified since T1.

During the restoring a read operation from a track on the source volume results in a read operation from the corresponding track on the target volume, if said read operation from the source volume was originated from a host system, and if the track on the source volume was not written to after the restoring started; and a read operation from a track on the source volume results in a local read from said track on the source volume, if said read operation from the source volume is a result of a read operation from a track on the target volume that refers to the corresponding track in the source volume, or if said read operation from the source volume was originated from a host system, and the track on the source volume was written to after the restoring started.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate data restoration in a computing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
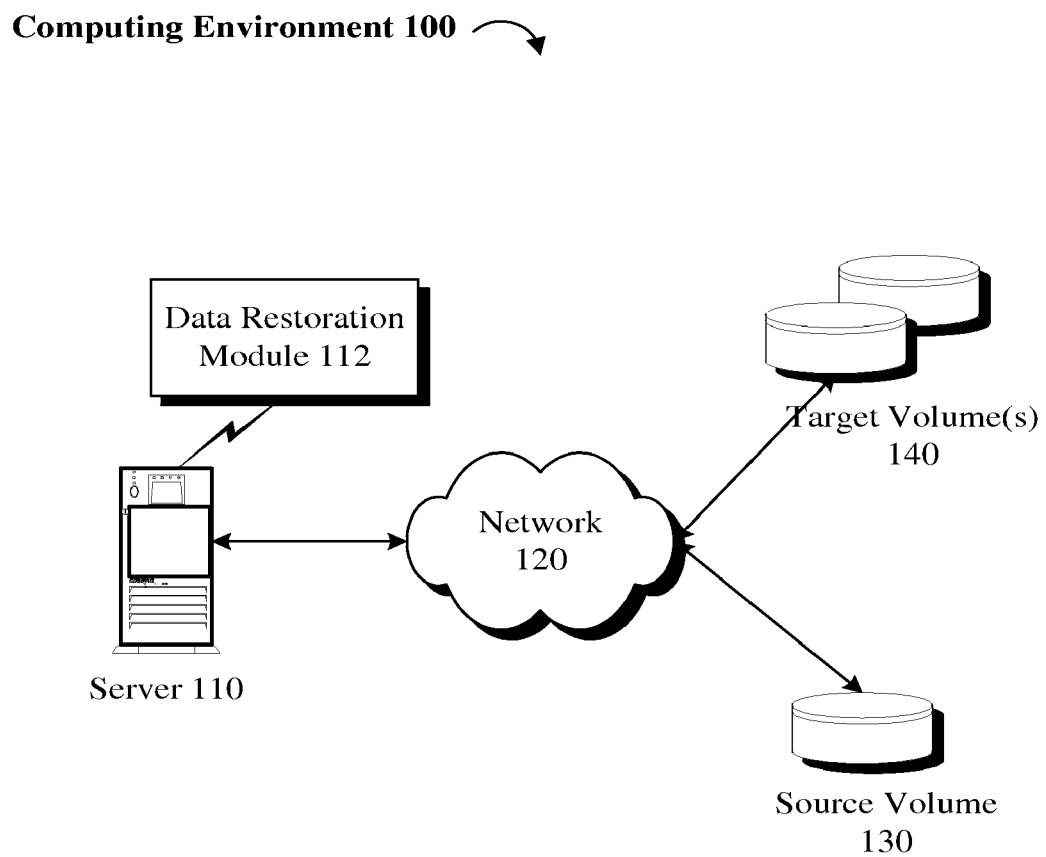
FIG. 1 illustrates an exemplary computing environment in accordance with one or more embodiments.

Referring to FIG. 1, in accordance with one embodiment, an exemplary computing environment 100 may comprise a server 110 and one or more storage volumes (130, 140) communicating with server 110 over a network 120. In the exemplary embodiment illustrated in FIG. 1, a source volume 130 refers to one or more storage volumes on which the most current version of a data collection is stored, and target volumes 140 refer to one or more storage volumes on which snapshots (e.g., flash copies) of the data stored on source volume 130 are stored.

In accordance with one embodiment, a snapshot includes copies of data stored on source volume 130 at a particular point in time. A snapshot mechanism, such as data restoration module 112, may be used, for example, to store the snapshot data on one or more target volumes 140. Using file structure information and metadata associated with each snapshot, data management module 112 may restore the data on source volume 130 as of the point in time when a selected snapshot was taken.

Depending on implementation, data management module 112 may be executed over an operating system, or included in data protection software, or in other application software executed on server 110 or other computing systems (not shown) connected to network 120. Data management module 112 may be configured to take snapshots and, for example, automatically create restoration points of a data collection stored on source volume 130, for backup purposes.

To maintain storage efficiency, in one embodiment, a single snapshot of a source volume 130 may not contain a comprehensive copy of all the data stored on the source volume 130. That is, depending on implementation, a snapshot volume 140 may locally include a copy of data that existed on the source volume 130 before the snapshot was taken, and remotely refer to the data that remains intact on the source volume 130 since the snapshot was taken.

In other words, a read operation from a track on a target volume 140 may be redirected (e.g., by way of a link, a pointer or other form of association) to a corresponding track on source volume 130. In such an implementation, a track on a target volume 140 that is associated with a corresponding track on a remote volume (e.g., source volume 130), is referred to as a remote track. Non-remote tracks are referred to as local tracks.

In certain embodiments, a bitmap or other data structure may be implemented to keep a record of tracks on a volume for the purpose of determining whether a track is designated as either local or remote. A read operation from a local track on a first volume results in reading the data from the local track on the first volume directly. A read operation from a remote track on a first volume results in a read operation (i.e., a redirected read) performed on a corresponding track on a second volume.

In one embodiment, to restore data on source volume 130, based on snapshot data stored on a target volume 140, copies of data on remotely designated tracks may be gathered by following a cascade of redirected links either to target volume 140 or possibly to other snapshot volumes, depending on implementation. In other words, during the restore operation, certain tracks (i.e., tracks that include corrupt data) on the source volume 130 may be designated as remote, such that a host read to source volume 130 for such tracks is redirected to a corresponding track on a target volume 140. If the data is not locally available on target volume 140, a read from target volume 140 is redirected to a track on a remote volume (e.g., source volume 130) on which such data is stored.

The above implementation may result in data loss or other undesirable results, if redirected reads are not properly processed. For example, Target Track[i] may refer to Source Track[i] having a value X. If Source Track[i] refers to Target Track[i] that refers back to Source Track[i], then an infinite loop may be encountered. To avoid the above-noted problem, in one embodiment, a read operation from either of the respective tracks on source volume 130 and target volume 140 are treated within the context in which the read request is submitted. That is, a read request submitted directly by a host system is treated differently than a read request that is the result of a redirect from target volume 140.

Figure 2:
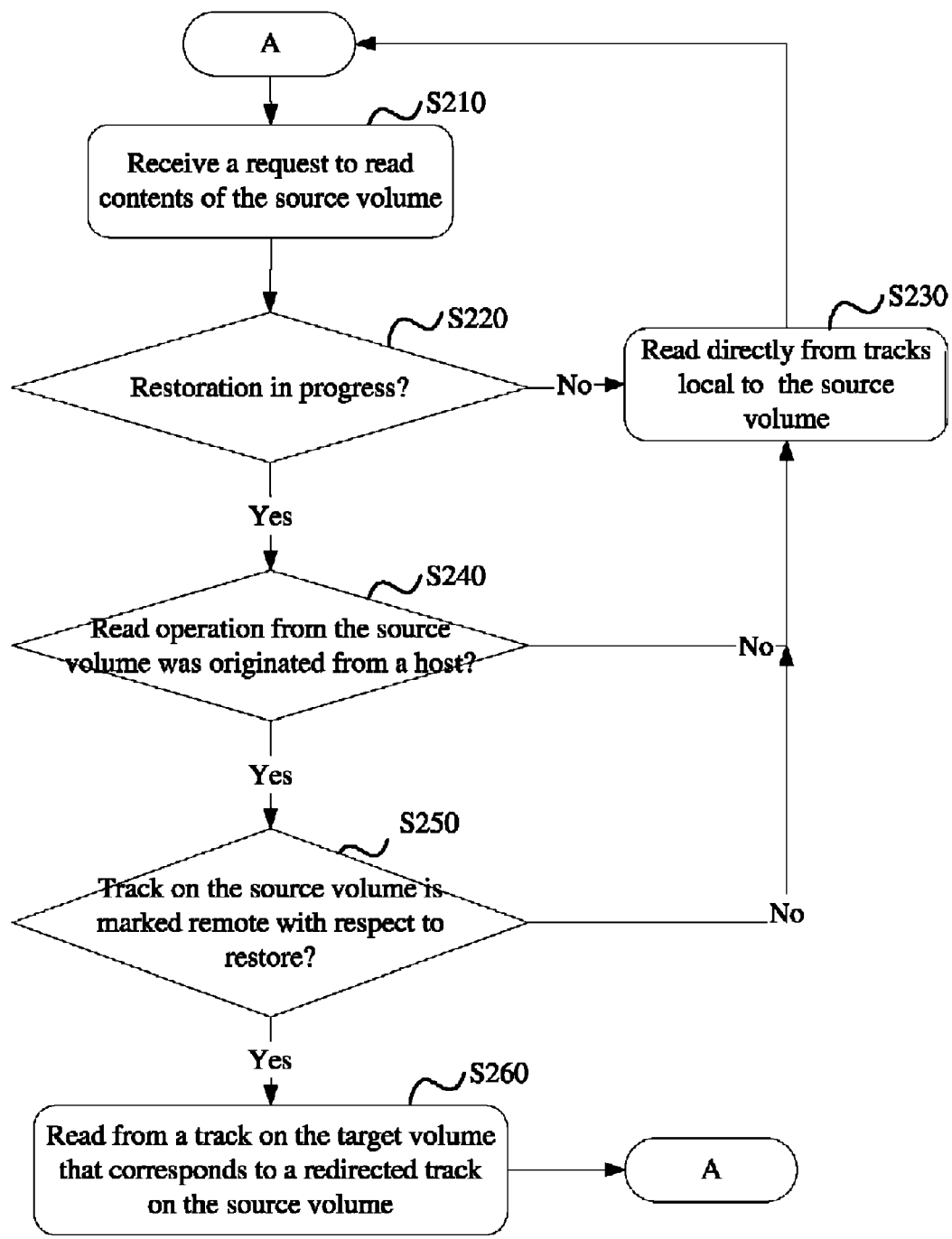
FIG. 2 is a flow diagram of a method for reading data during data restoration from a snapshot volume to a source volume, in accordance with one embodiment.

Referring to FIG. 2, when a request to read contents from a track on source volume 130 (e.g., ST[i]) is received (S210), it is determined whether a restoration process is in progress (S220). If not, then the read operation is processed so that data is directly read from ST[i] (S230). Otherwise, if restoration is in progress, then it is determined whether a read operation from ST[i] was originated from a host (S240). If it is determined that the read operation from ST[i] was not originated from a host (e.g., the read was originated from a redirected read from a track on target volume 140, for example), then the data is read directly from ST[i] (S230); otherwise it is determined whether ST[i] is designated as remote or local with respect to the restore operation (S250). If ST[i] is designated as local, then the data is read directly from ST[i] (S230). If ST[i] is designated as remote, however, then the data is read from a track on target volume 140 (e.g., TT[i]), where TT[i] corresponds ST[i], such that ST[i] is redirected to TT[i] (S260).

Figure 3:
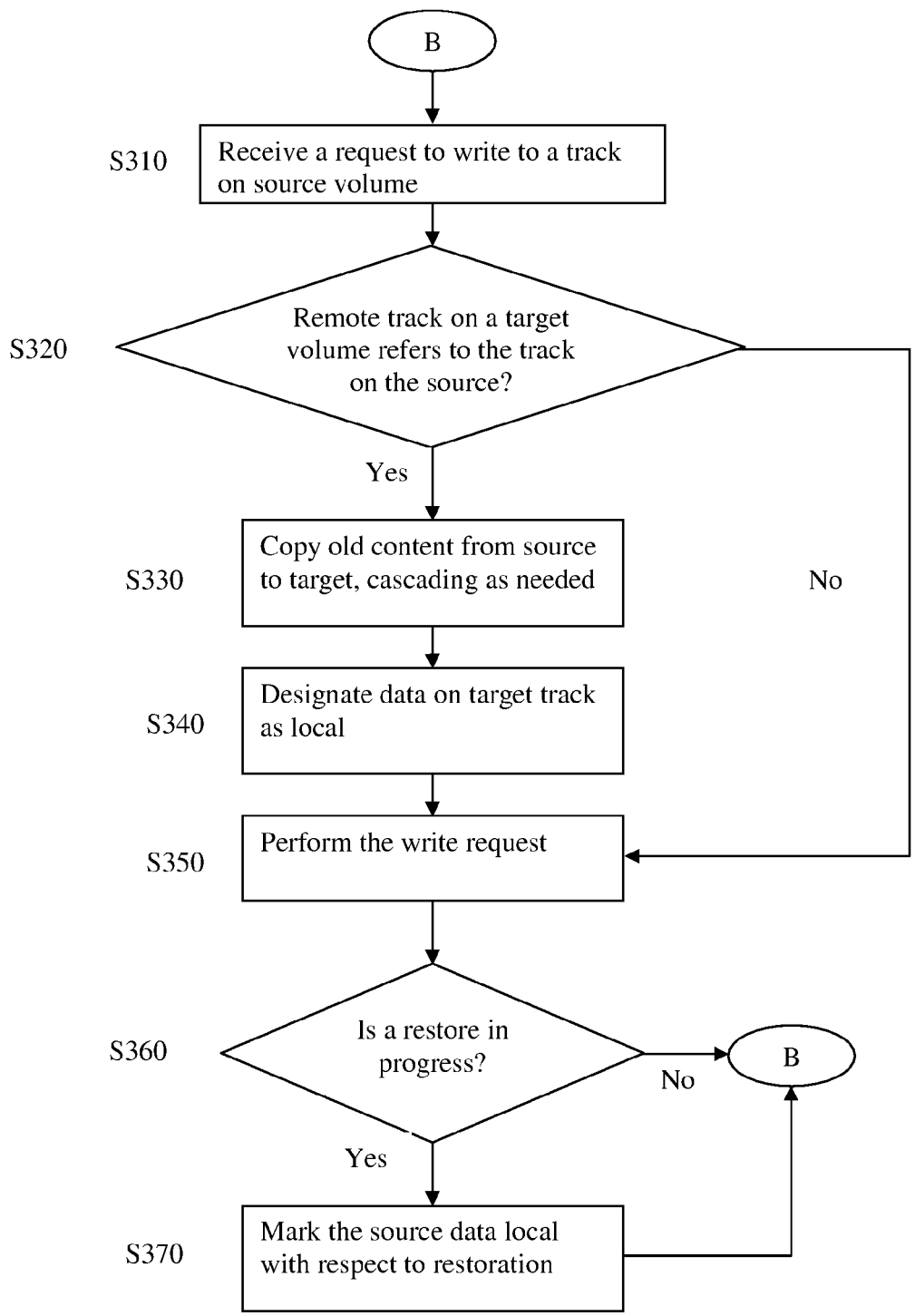
FIG. 3 is a flow diagram of a method for writing data during data restoration from a snapshot volume to a source volume, in accordance with one embodiment.

Referring to FIG. 3, when a request to write to a track on source volume 130 (e.g., ST[i]) is received (S310), it is determined whether a track on target volume 140 (e.g., TT[i]) corresponds to ST[i] (S320). That is, it is determined whether TT[i] is redirected to ST[i]. If so, then old content from ST[i] is copied to TT[i], cascading to tracks on other target volumes if needed (S330). Thereafter, the redirect correspondence from TT[i] to ST[i] is removed (S340) and the write request is performed, by writing the data to ST[i] (S350).

Referring back to process S320, if TT[i] does not correspond to ST[i], the data is written to ST[i] directly (S350). If a restore operation is in progress (S360), the data written to ST[i] is designated as local with respect to restoration (S370), so that any future reads from ST[i] are not redirected to any other volumes. In certain embodiments, while the restoration is in progress, tracks on source volume 130 that are redirected to tracks on target volume 140 are restored based on the content in the corresponding track on target volume 140. Once restoration is completed, the redirect links from source volume 130 to target volume 130 are removed.

In different embodiments, the invention can be implemented either entirely in the form of hardware or entirely in the form of software, or a combination of both hardware and software elements. For example, server 110, host systems (not shown) and data restoration module 112 may comprise a controlled computing system environment that can be presented largely in terms of hardware components and software code executed to perform processes that achieve the results contemplated by the system of the present invention.

Figure 4:
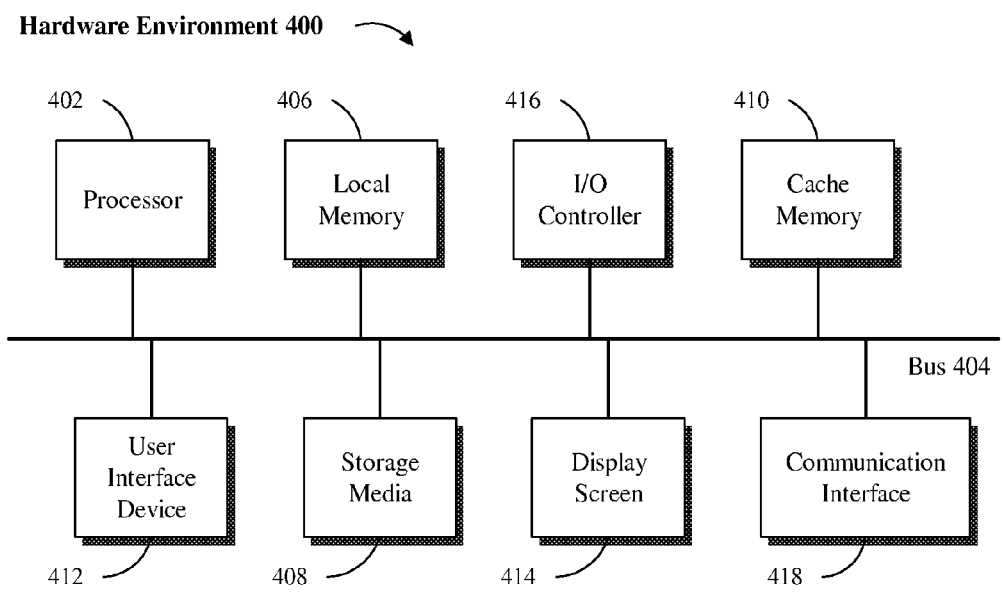
FIGS. 4 and 5 are block diagrams of hardware and software environments in which a system of the present invention may operate, in accordance with one or more embodiments.
Figure 5:
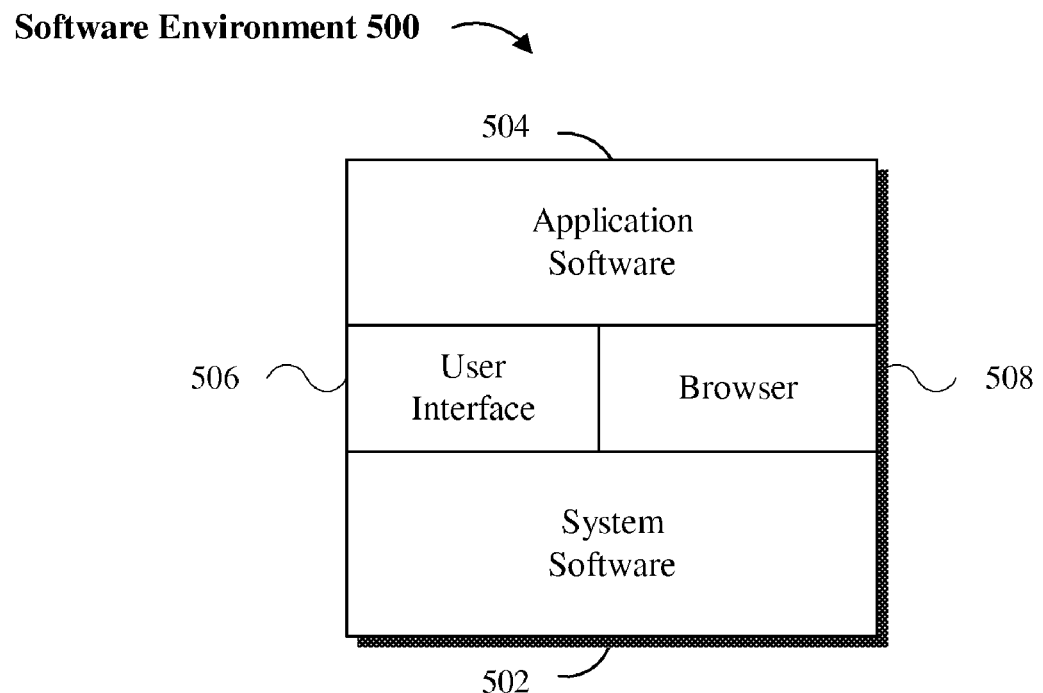

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, data restoration module 112 may be implemented as system software 502 and application software 504 executed on one or more hardware environments to facilitate data restoration and backup. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multi-processing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method for restoring data, the method comprising:
   restoring first data on a source volume from second data on a target volume,
   wherein the second data is a snapshot of the first data taken at time T1, such that each track on the target volume corresponds to a track on the source volume,
   wherein a track on the target volume includes a local copy of data that existed on a corresponding track on the source volume prior to T1, if data stored on the corresponding track on the source volume was modified since T1,
   wherein the second data does not contain a comprehensive copy of all of the first data on the source volume,
   wherein during the restoring:
   a read operation from a track on the source volume results in a read operation from the corresponding track on the target volume, if said read operation from the source volume was originated from a host system, and if the track on the source volume was not written to after the restoring started; and a read operation from a track on the source volume results in a local read from said track on the source volume, if said read operation from the source volume is a result of a read operation from a track on the target volume corresponding to the track in the source volume.

2. The method of claim 1, wherein a track on the target volume refers to a corresponding track on the source volume, if data stored on the corresponding track on the source volume has not been modified since T1.

3. The method of claim 2, wherein during the restoring, a track on the source volume refers to a corresponding track on the target volume, if data stored on the track on the source volume has been modified since T1.

4. The method of claim 3, further comprising removing references from tracks on the source volume to tracks on the target volume, in response to the restoring being completed, wherein the second data does not contain a comprehensive copy of all of the first data on the source volume.

5. The method of claim 1 where restoring comprises writing data to a track after T1.

6. A data restoration method comprising:
determining whether a restoration process is in progress, in response to receiving a read request to read contents from a track on a source volume (ST[i]);
reading data directly from ST[i], in response to determining that the restoration process is not in progress;
determining whether the read request was originated from a host, in response to determining that the restoration process is in progress;
reading the data directly from ST[i], in response to determining that the read request was not originated from a host;
determining whether ST[i] is designated as remote or local with respect to the restore operation, in response to determining that the read request was originated from a host;
reading the data directly from ST[i], in response to determining that ST[i] is designated as local; and
reading the data from a track on a target volume (TT[i]), in response to determining that ST[i] is designated as remote.

7. The method of claim 6, wherein ST[i] is designated as remote when ST[i] refers to TT[i], such that a read request for content stored on ST[i] is redirected to TT[i].

8. The method of claim 7, wherein the remote or local designation for each track on the source or the target volume is implemented in a data structure.

9. The method of claim 8, wherein the data structure is a bitmap wherein each bit in the bitmap is associated with a track on the source volume, such that a first value associated with a bit designates the corresponding track as local, and a second value associated with a bit designates the corresponding track as remote.

10. The method of claim 9, wherein the first value is 0 and the second value is 1, and wherein the data is read directly from ST[i] is in response to determining that the read request was not originated from a host and the restoration process is in progress.

11. A data restoration method comprising:
determining whether data stored on a first volume track (TT[i]) is remote, in response to receiving a write request to write first data to a track on a second volume ST[i];
copying second data stored on ST[i] to TT[i], in response to determining that TT[i] data is remote;
designating TT[i] data as local;
writing the first data to ST[i]; and
designating the first data written to ST[i] as local so that future reads from ST[i] are not redirected to TT[i].

12. A data restoration system comprising:
a processor coupled to one or more computer readable media or memory elements;
a logic unit for determining whether a restoration process is in progress, in response to receiving a read request to read contents from a track on a source volume (ST[i]);
a logic unit for reading data directly from ST[i], in response to determining that the restoration process is not in progress;
a logic unit for determining whether the read request was originated from a host, in response to determining that the restoration process is in progress;
a logic unit for reading the data directly from ST[i], in response to determining that the read request was not originated from a host and that the restoration process is in progress;
a logic unit for determining whether ST[i] is designated as remote or local with respect to the restore operation, in response to determining that the read request was originated from a host;
a logic unit for reading the data directly from ST[i], in response to determining that ST[i] is designated as local; and
reading the data from a track on a target volume (TT[i]), in response to determining that ST[i] is designated as remote.

13. The system of claim 12, wherein ST[i] is designated as remote when ST[i] refers to TT[i], such that a read request for content stored on ST[i] is redirected to TT[i].

14. The system of claim 13, wherein the remote or local designation for each track on the source or the target volume is implemented in a data structure.

15. The system of claim 14, wherein the data structure is a bitmap wherein each bit in the bitmap is associated with a track on the source volume, such that a first value associated with a bit designates the corresponding track as local, and a second value associated with a bit designates the corresponding track as remote.

16. The method of claim 15, wherein the first value is 0 and the second value is 1.

17. A data restoration system comprising:
a processor coupled to one or more computer readable media or memory elements;
a logic unit for determining whether data stored on a first volume track (TT[i]) is remote, in response to receiving a write request to write first data to a track on a second volume ST[i];
a logic unit for copying second data stored on ST[i] to TT[i], in response to determining that TT[i] data is remote;
a logic unit for designating TT[i] data as local;
a logic unit for writing the first data to ST[i]; and a logic unit for designating the first data written to ST[i] as local so that future reads from ST[i] are not redirected to TT[i].

18. The system of claim 17, wherein ST[i] is designated as remote when ST[i] refers to TT[i], such that a read request for content stored on ST[i] is redirected to TT[i].

19. The system of claim 18, wherein the remote or local designation for each track on the source or the target volume is implemented in a data structure.

20. The system of claim 19, wherein the data structure is a bitmap wherein each bit in the bitmap is associated with a track on the source volume, such that a first value associated with a bit designates the corresponding track as local, and a second value associated with a bit designates the corresponding track as remote.

\* \* \* \* \*